US012676138B2

(12) United States Patent
Dai et al.

(10) Patent No.: US 12,676,138 B2
(45) Date of Patent: Jul. 7, 2026

(54) SPEECH SYNTHESIS METHOD AND APPARATUS, ELECTRONIC DEVICE, AND READABLE STORAGE MEDIUM

(71) Applicant: Lemon Inc., Grand Cayman (KY)

(72) Inventors: Dongyang Dai, Beijing (CN); Yuanzhe Chen, Beijing (CN); Li Chen, Beijing (CN); Yuping Wang, Beijing (CN); Qiao Tian, Beijing (CN); Ming Tu, Los Angeles, CA (US); Rui Xia, Los Angeles, CA (US); Yuxuan Wang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 188 days.

(21) Appl. No.: 18/568,261

(22) PCT Filed: Sep. 16, 2022

(86) PCT No.: PCT/SG2022/050665

§ 371 (c)(1),
(2) Date: Dec. 7, 2023

(87) PCT Pub. No.: WO2023/048638

PCT Pub. Date: Mar. 30, 2023

(65) Prior Publication Data

US 2024/0274120 A1 Aug. 15, 2024

(30) Foreign Application Priority Data

Sep. 22, 2021 (CN) .......................... 202111107876.2

(51) Int. Cl.
*G10L 13/027* (2013.01)
*G10L 25/18* (2013.01)

(52) U.S. Cl.
CPC ........... *G10L 13/027* (2013.01); *G10L 25/18* (2013.01)

(58) Field of Classification Search
CPC .............................. G10L 13/027; G10L 25/18
See application file for complete search history.

(56) References Cited

U.S. PATENT DOCUMENTS

| | | | | |
|---|---|---|---|---|
| 10,325,599 | B1 * | 6/2019 | Naidu | G06F 40/295 |
| 10,453,476 | B1 * | 10/2019 | Aryal | G10L 25/30 |

(Continued)

FOREIGN PATENT DOCUMENTS

| | | | |
|---|---|---|---|
| CN | 105845125 | A | 8/2016 |
| CN | 110534089 | A | 12/2019 |

(Continued)

OTHER PUBLICATIONS

Shen et al, Natural TTS Synthesis By Conditioning Wavenet On MEL Spectrogram Predictions , Feb. 16, 2018 (Year: 2018).*

(Continued)

*Primary Examiner* — Kevin Ky
(74) *Attorney, Agent, or Firm* — BakerHostetler

(57) ABSTRACT

Provided are an audio synthesis method and apparatus, an electronic device, and a readable storage medium. In the present solution, conversion from a text to an audio having a target timbre is achieved by means of a pre-trained voice synthesis model, the voice synthesis model comprising a first feature extraction sub-model and a second feature extraction sub-model, wherein the first feature extraction sub-model outputs, according to an inputted text to be processed, an acoustic feature comprising a bottleneck feature; the second feature extraction sub-model outputs, according to the inputted first acoustic features, a Mel spectrum feature corresponding to the text to be processed; according to the Mel spectrum feature corresponding to the text to be processed, the target audio corresponding to the text to be processed is obtained, and the target audio has the target timbre.

20 Claims, 3 Drawing Sheets

(56) References Cited

U.S. PATENT DOCUMENTS

| | | | | |
|---|---|---|---|---|
| 2020/0160218 | A1* | 5/2020 | Itakura | G10L 25/51 |
| 2020/0395028 | A1* | 12/2020 | Kameoka | G06N 3/0464 |
| 2021/0201890 | A1* | 7/2021 | Wang | G10L 25/18 |
| 2021/0210110 | A1* | 7/2021 | Baughman | G10L 21/003 |
| 2022/0068259 | A1* | 3/2022 | Pan | G10L 25/63 |
| 2022/0208173 | A1* | 6/2022 | Chang | G10L 13/027 |

FOREIGN PATENT DOCUMENTS

| | | | |
|---|---|---|---|
| CN | 111508470 | A | 8/2020 |
| CN | 112331177 | A | 2/2021 |
| CN | 112365882 | A | 2/2021 |

OTHER PUBLICATIONS

Huang et al, On Prosody Modeling for ASR+TTS Based Voice Conversion, Jul. 20, 2021 (Year: 2021).*

Zhang et al, Sequence-to-Sequence Acoustic Modeling for Voice Conversion, Jan. 12, 2020 (Year: 2020).*

International Patent Application No. PCT/SG2022/050665; Int'l Search Report; dated Apr. 6, 2023; 3 pages.

* cited by examiner

SPEECH SYNTHESIS METHOD AND APPARATUS, ELECTRONIC DEVICE, AND READABLE STORAGE MEDIUM

CROSS-REFERENCE OF RELATED APPLICATIONS

The present application is the U.S. National Stage of International Application No. PCT/SG2022/050665, filed on Sep. 16, 2022, which claims priority to Chinese patent application No. 202111107876.2, filed on Sep. 22, 2021, entitled as "SPEECH SYNTHESIS METHOD AND APPARATUS, ELECTRONIC DEVICE, AND READABLE STORAGE MEDIUM", which are incorporated herein by reference in their entireties.

FIELD

The present disclosure relates to the field of intelligent artificial technology, and more specifically, to method, apparatus, electronic device and readable storage medium for speech synthesis.

BACKGROUND

TTS (text to speech) is a technology that converts texts into audios. As one of the current popular speech synthesis technologies, TTS has been extensively applied in various industries, e.g., video creation, intelligent customer service, smart reading and smart dubbing etc.

With the continuous development of artificial intelligent technology, the speech synthesis technique has been deeply applied into various working and living scenarios. The users have put a higher demand on speech synthesis, e.g., individualized speech synthesis. For example, in a scenario of video creation, while creating a video, the user intends to convert a segment of text into audio with specific timbre and adds the audio with specific timbre into the video as the soundtrack, making the video more individualized. However, it is currently an urgent issue to convert the text into the audio with specific timbre.

SUMMARY

To fully or at least partly address the above technical problem, the present disclosure provides a method, apparatus, electronic device and readable storage medium for speech synthesis.

In a first aspect, the present disclosure provides a method for speech synthesis, comprising: obtaining text to be processed; inputting the text to be processed to a target speech synthesis model and obtaining a Mel spectrum sequence corresponding to the text to be processed output by the target speech synthesis model; wherein the target speech synthesis model includes a first sub-model for feature extraction and a second sub-model for feature extraction, wherein the first sub-model for feature extraction is used for outputting a first acoustic feature according to the input text to be processed, the first acoustic feature including a bottleneck feature corresponding to the text to be processed; the second sub-model for feature extraction is used for outputting the Mel spectrum feature corresponding to the text to be processed according to the first acoustic feature as input; obtaining, in accordance with the Mel spectrum feature corresponding to the text to be processed, a target audio corresponding to the text to be processed, the target audio having a target timbre.

In some possible implementations, the first sub-model for feature extraction is obtained by training based on labeled text corresponding to a first sample audio and a second acoustic feature corresponding to the first sample audio, the second acoustic feature including a first labeled bottleneck feature corresponding to the first sample audio.

In some possible implementations, the second sub-model for feature extraction is obtained by training based on a third acoustic feature and a first labeled Mel spectrum feature corresponding to a second sample audio, and a fourth acoustic feature and a second labeled Mel spectrum feature corresponding to a third sample audio; wherein the third acoustic feature includes a second labeled bottleneck feature corresponding to the second sample audio; the fourth acoustic feature includes a third labeled bottleneck feature corresponding to the third sample audio; and the third sample audio is a sample audio having the target timbre.

In some possible implementations, the first labeled bottleneck feature corresponding to the first sample audio, the second labeled bottleneck feature corresponding to the second sample audio and the third labeled bottleneck feature corresponding to the third sample audio are obtained by performing, using a an encoder of an end-to-end speech recognition model, bottleneck feature extraction on the first sample audio, the second sample audio and the third sample audio as input respectively.

In some possible implementations, the second acoustic feature further includes a first labeled baseband feature corresponding to the first sample audio; the third acoustic feature further includes a second labeled baseband feature corresponding to the second sample audio; and the fourth acoustic feature further includes a third labeled baseband feature corresponding to the third sample audio; and correspondingly, the first acoustic feature output by the first sub-model for feature extraction further includes a baseband feature corresponding to the text to be processed.

In some possible implementations, the first labeled baseband feature corresponding to the first sample audio, the second labeled baseband feature corresponding to the second sample audio and the third labeled baseband feature corresponding to the third sample audio are obtained by performing digital signal processing on the first sample audio, the second sample audio and the third audio respectively.

In some possible implementations, a language of the first sample audio is the same as that of the second sample audio; and the language of the first sample audio is different from that of the third sample audio.

In a second aspect, the present disclosure provides an apparatus for speech synthesis, comprising: an obtaining module for obtaining a text to be processed; a processing module for inputting the text to be processed to a target speech synthesis model and obtaining a Mel spectrum sequence corresponding to the text to be processed output by the target speech synthesis model; wherein the target speech synthesis model includes a first sub-model for feature extraction and a second sub-model for feature extraction, wherein the first sub-model for feature extraction is used for outputting a first acoustic feature according to the input text to be processed, the first acoustic feature including a bottleneck feature corresponding to the text to be processed; the second sub-model for feature extraction is used for outputting the Mel spectrum feature corresponding to the text to be processed according to the first acoustic feature as input; the processing module is further used for obtaining, in accordance with the Mel spectrum feature corresponding to the text to be processed, a target audio corresponding to the text to be processed, the target audio having a target timbre.

In a third aspect, the present disclosure provides an electronic device, comprising: a memory, a processor and computer program instructions; the memory is configured to store the computer programs; the processor is configured to execute the computer programs to implement the method for speech synthesis according to the first aspect.

In a fourth aspect, the present disclosure provides a readable storage medium comprising: computer program instructions; wherein the computer program instructions, when executed by at least one processor of the electronic device, implement the method for speech synthesis according to the first aspect.

In a fifth aspect, the present disclosure provides a program product, comprising: computer program instructions; wherein the computer program instructions are stored in the readable storage medium, and the electronic device obtains the computer program instructions from the readable storage medium, the computer program instructions, when executed by at least one processor of the electronic device, implementing the method for speech synthesis according to the first aspect.

The present disclosure provides method, apparatus, electronic device and readable storage medium for speech synthesis, wherein the present solution converts the text into the audio with target timbre through a pre-trained speech synthesis model. The speech synthesis model includes a first sub-model for feature extraction and a second sub-model for feature extraction, wherein the first sub-model for feature extraction outputs a first acoustic feature according to the input text to be processed, the first acoustic feature including a bottleneck feature; the second sub-model for feature extraction outputs the Mel spectrum feature corresponding to the text to be processed according to the input first acoustic feature; a target audio corresponding to the text to be processed is obtained in accordance with the Mel spectrum feature corresponding to the text to be processed, the target audio having a target timbre. The present solution decouples the speech synthesis model into two models according to the first acoustic features containing the bottleneck features. Therefore, the timbre and other features may independently control the speech synthesis, so as to satisfy the user's need for individualized speech synthesis.

BRIEF DESCRIPTION OF THE DRAWINGS

The drawings here are incorporated into the description as a part of it, illustrate the embodiments compliant with the present disclosure, and are combined with the description to explain the principles of the present disclosure.

To more clearly explain the embodiments of the present disclosure or technical solutions in related art, the drawings needed in the description of the embodiments or the related art are to be introduced simply below. Apparently, those skilled in the art may also obtain other drawings from those illustrated without any exercises of inventive work.

DETAILED DESCRIPTION OF EMBODIMENTS

Figure 1A:
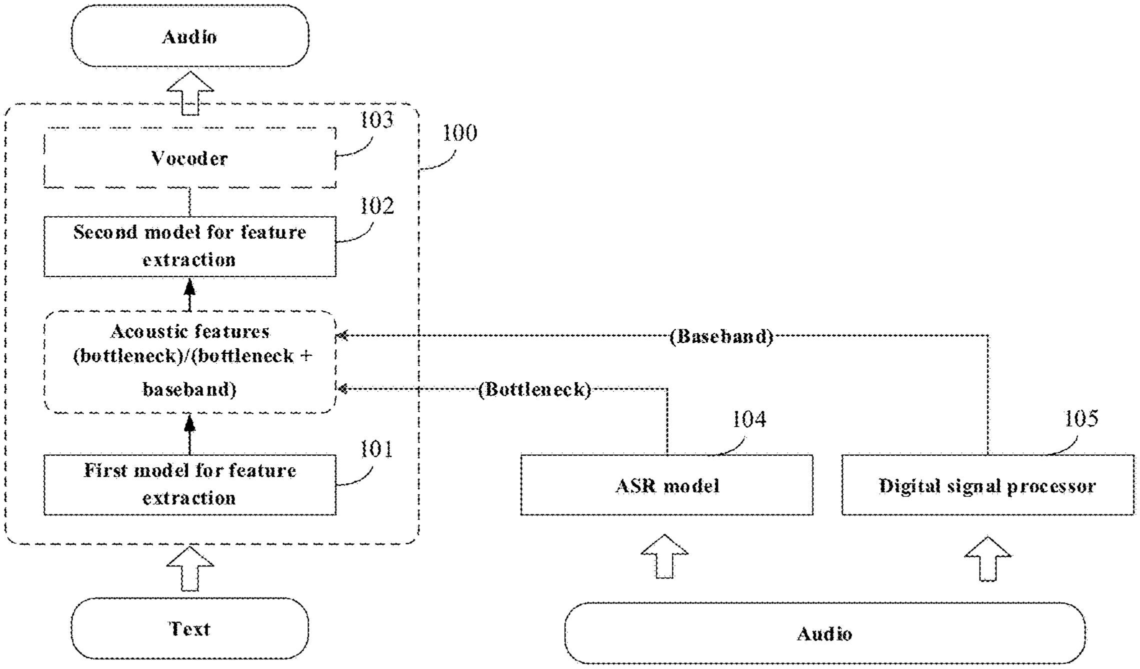
FIGS. 1*a* to 1*c* are structural diagrams of a speech synthesis model provided by some embodiments of the present disclosure.

For a clearer understanding of the above objectives, features and advantages of the present disclosure, the solution of the present disclosure is to be further described below. It is to be appreciated that embodiments of the present disclosure and features within the embodiments may be combined with one another without causing conflicts.

Many details are elaborated in the following description to provide a more comprehensive understanding of the present disclosure. However, the present disclosure also may be implemented in different ways than those described here. Apparently, the embodiments disclosed in the description are only part of the embodiments of the present disclosure, rather than all of them.

The present disclosure proposes a method, apparatus, electronic device and readable storage medium for speech synthesis, wherein the method converts texts to audios with target timbre by a pre-trained speech synthesis model. In the speech synthesis model, the timbre and other features may control the speech synthesis in a relatively independent way, so as to satisfy the user's need for individualized speech synthesis.

The method for speech synthesis provided by the present disclosure may be executed by an electronic device, wherein the electronic device may be tablet computer, mobile phone (e.g., foldable phone, large screen mobile phone etc.), wearable device, on-board device, augmented reality (AR)/virtual reality (VR) device, notebook computer, ultra-mobile personal computer (UMPC), netbook, personal digital assistant (PDA), smart television, smart screen, high-definition television, 4K TV, smart speaker and smart projectors among other Internet of Things (IOT). The specific types of electronic devices are not restricted in the present disclosure.

It should be noted that the electronic device that obtains the speech synthesis model by training and the electronic device that performs the speech synthesis service with the speech synthesis model may be different or same. The present disclosure is not restricted in this regard. For example, a server device trains the speech synthesis model, and sends the trained speech synthesis model to a terminal device/server device, and the terminal device/server device performs the speech synthesis service according to the speech synthesis model. For another example, the server device trains the speech synthesis model, and then the trained speech synthesis model is deployed on the server device. After that, the server device calls the speech synthesis model to process the speech synthesis service. The present disclosure is not restricted in this regard. The above features may be flexibly configured in the practical applications.

Next, the speech synthesis model in the present solution is introduced in the first place.

By introducing acoustic features including bottleneck features, the speech synthesis model in this solution decouples the speech synthesis model into two sub-models, namely: the first sub-model for feature extraction and the second sub-model for feature extraction, where the first sub-model for feature extraction is used to establish a deep mapping between text sequences and acoustic features containing bottleneck features; and the second sub-model for feature extraction is used to establish a deep mapping between acoustic features containing bottleneck features and Mel spectrum features. On this basis, the present solution at least achieves the following effects:

1. The Two Decoupled Sub-Models for Feature Extraction may be Trained Using Different Sample Audios.

Specifically, the model for establishing a deep mapping between text sequences and acoustic features containing bottleneck features, i.e., the first sub-model for feature extraction, is trained using the high-quality first sample audio and the labeled texts corresponding to the first sample audio collectively as the sample data.

The model for establishing a deep mapping between acoustic features containing bottleneck features and Mel spectrum features, i.e., the second sub-model for feature extraction, may be trained using the second sample audio, the corresponding text of which are not labeled. Since it is not required to label the text corresponding to the second sample audio, the costs for obtaining the second sample audio may be greatly reduced.

2. By Decoupling the Speech Synthesis Model, Timbres and Other Features May Control the Speech Synthesis in a Relatively Independent Way.

Specifically, the acoustic features containing bottleneck features are irrelevant of timbres, wherein the acoustic features output by the first sub-model for feature extraction mainly include information in the aspects of rhythms and contents etc.

Besides the above information in the aspects of rhythms and contents etc., the Mel spectrum features output by the second sub-model for feature extraction also include timbre information.

3. The Requirement for the Third Sample Audio with the Target Timbre is also Lowered.

The speech synthesis model may be trained with fewer third sample audios having the target timbre, such that the final speech synthesis model has an audio with the target timbre. In addition, even if the third sample audio is poor in quality, e.g., the pronunciation is poor and the speech is not fluent etc., the speech synthesis model still can stably synthesize the audio with the target timbre.

Since the second sub-model for feature extraction for controlling the timbre has been trained based on the second sample audio, the second sub-model for feature extraction already has a relatively mature speech synthesis control power over the timbre. Therefore, the second sub-model for feature extraction can still satisfactorily understand the target timbre through learning a small amount of third sample audios.

The training of the speech synthesis model is to be introduced in details below with reference to several specific embodiments. In the following embodiments, the electronic device serves as the example to give a detailed introduction with reference to the drawings.

Figure 1B:
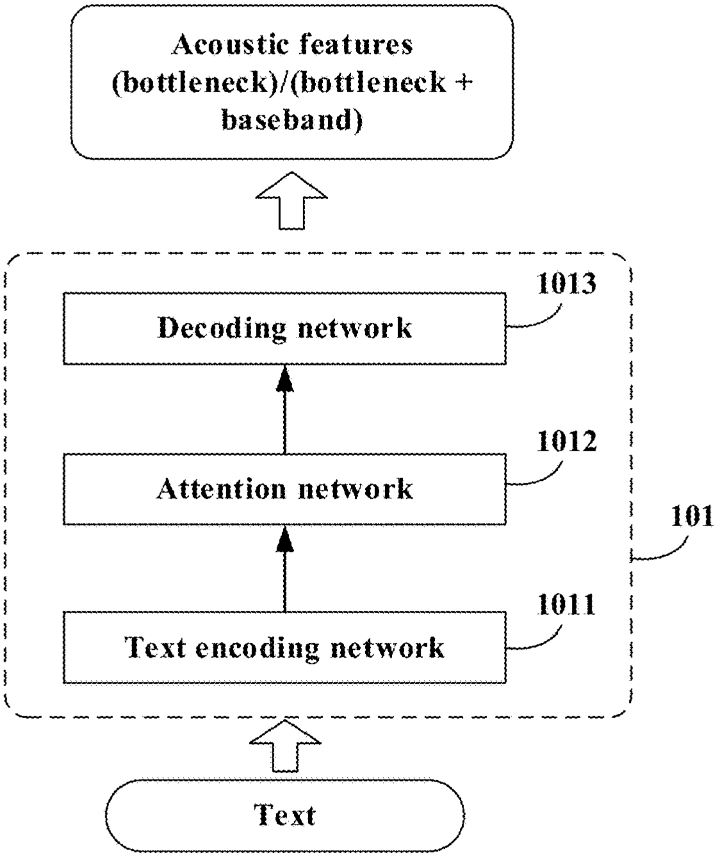
Figure 1C:
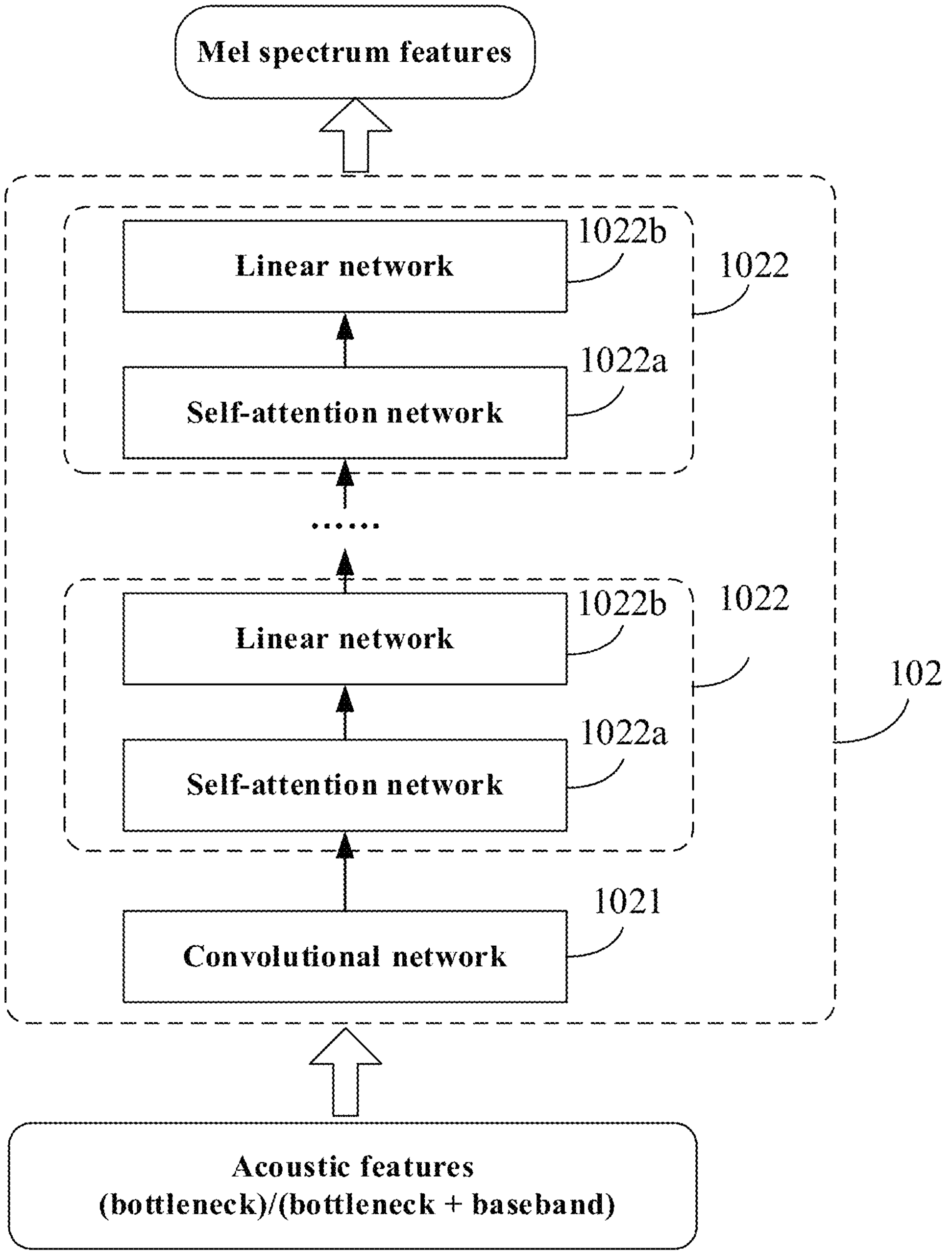

FIG. 1*a* illustrates a framework for training and obtaining the speech synthesis model; FIGS. 1*b* and 1*c* respectively illustrate structural diagrams of the first sub-model for feature extraction and the second sub-model for feature extraction included in the speech synthesis model.

With reference to FIG. 1*a*, the speech synthesis model 100 comprises: a first sub-model for feature extraction 101 and a second sub-model for feature extraction 102. The training process of the speech synthesis model 100 includes the training process for the first sub-model for feature extraction 101 and the training process for the second sub-model for feature extraction 102.

The training process for the first sub-model for feature extraction 101 and the training process for the second sub-model for feature extraction 102 are separately introduced below.

I. Training the First Sub-Model for Feature Extraction 101

The first sub-model for feature extraction 101 is trained based on the labeled texts and labeled acoustic features corresponding to the first sample audio (the labeled acoustic features corresponding to the first sample audio subsequently referred to as second acoustic features). By learning the relationship between the labeled texts corresponding to the first sample audio and the second acoustic features, the first sub-model for feature extraction 101 gains the capability to establish a deep mapping between texts and acoustic features including bottleneck features.

The first sub-model for feature extraction 101 is specifically used for analyzing the labeled texts corresponding to the input first sample audio, modeling the intermediate feature sequences, performing feature conversion and dimensionality reduction on the intermediate feature sequences and then outputting the fifth acoustic features corresponding to the labeled texts.

Afterwards, the loss function information in this round of training may be calculated based on the second acoustic features corresponding to the first sample audio, the fifth acoustic features corresponding to the first sample audio and the pre-established loss function. Coefficient values of the parameters included in the first sub-model for feature extraction 101 are adjusted in accordance with the loss function information in this round of training.

Through continuous iterative training of a plurality of first sample audios, labeled texts corresponding to the first sample audios and the second acoustic features corresponding to the first sample audios (including first labeled bottleneck features), the first sub-model for feature extraction 101 meeting the corresponding convergence conditions is finally obtained.

During the training process, the second acoustic features corresponding to the first sample audio may be understood as the learning objective of the first sub-model for feature extraction 101.

The first sample audio may include high-quality audio files (also may be understood as clean audios), and the labeled texts corresponding to the first sample audio may be character sequence or phoneme sequence corresponding to the first sample audio. The present disclosure is not restricted in this regard. The first sample audio may be obtained through recording and multiple cleaning according to the requirements; alternatively, it also may be screened from the TTS data stored in the audio database and further obtained through multiple cleaning. The present disclosure is not restricted in the acquisition manner of the first sample audio. Likewise, the labeled texts corresponding to the first sample audio also may be obtained through repeated labeling and correction, so as to guarantee the accuracy of the labeled texts.

Besides, the fifth acoustic features corresponding to the labeled text may be understood as predicted acoustic features corresponding to the labeled texts output by the first sub-model for feature extraction 101. The fifth acoustic features corresponding to the labeled text also may be understood as the fifth acoustic features corresponding to the first sample audio.

In some embodiments, the second acoustic features include: the first labeled bottleneck features corresponding to the first sample audio.

The bottleneck is a non-linear feature conversion technique and an effective dimensionality reduction technology. In the timbre-specific speech synthesis scenarios proposed in the present solution, the bottleneck features may include information in aspects of rhythms and contents etc.

In a possible implementation, the first labeled bottleneck features corresponding to the first sample audio may be obtained via an encoder of the end-to-end speech recognition (ASR) model.

In the following text, the end-to-end ASR model is referred to as the ASR model for short.

Schematically, with reference to FIG. 1*a*, the first sample audio may be input to the ASR model 104 to acquire the first labeled bottleneck features corresponding to the first sample audio output by the encoder of the ASR model 104, wherein the encoder of the ASR model 104 corresponds to an extractor for extracting the bottleneck features, and may be used for preparing the sample data in this solution.

It is to be noted that the ASR model 104 also may include other modules. For example, as shown in FIG. 1*a*, the ASR model 104 also includes an encoder and an attention network. The processing results output by other modules in the ASR model 104 apart from the encoder may not require any treatments. Besides, the present disclosure is not restricted to the functions and implementations of other modules or networks in the ASR model 104 apart from the encoder.

It is only an example to obtain the labeled bottleneck features corresponding to the first sample audio through the encoder in the ASR model 104. This should not be interpreted as a restriction for the implementations of obtaining the first labeled bottleneck features corresponding to the first sample audio. In practical use, the first labeled bottleneck features corresponding to the first sample audio may also be obtained in other ways and the present disclosure is not restricted in this regard. For example, some sample audios and the corresponding labeled bottleneck features of the sample audios also may be stored in the database, or acquired from the database.

In some further embodiments, the second acoustic features corresponding to the first sample audio include: the first labeled bottleneck features corresponding to the first sample audio and the first labeled baseband features corresponding to the first sample audio.

The first labeled bottleneck features may refer to the previous detailed description of the examples and will not be repeated here for conciseness.

Pitch is a subjective feeling perceived by human ears with respect to the sound. The pitch is mainly depending on the baseband of the sound. The pitch goes higher as the baseband frequency increases and becomes lower as the baseband frequency decreases. In the speech synthesis process, the pitch is also one of the important factors that influence the effects of speech synthesis. To provide the final speech synthesis model with a speech synthesis control capability for the pitch, the present solution also introduces the baseband frequencies along with the bottleneck features, such that the final first sub-model for feature extraction 101 is capable of outputting the corresponding bottleneck features and baseband features in accordance with the input texts.

The first sub-model for feature extraction 101 is specifically used for analyzing the labeled texts corresponding to the input first sample audio, modeling the intermediate feature sequences, performing feature conversion and dimensionality reduction on the intermediate feature sequences and then outputting the fifth acoustic features corresponding to the labeled texts.

The fifth acoustic features corresponding to the labeled text may be understood as predicted acoustic features corresponding to the labeled texts output by the first sub-model for feature extraction 101. The fifth acoustic features corresponding to the labeled text may be understood as the fifth acoustic features corresponding to the first sample audio.

It is to be noted that the second acoustic features corresponding to the first sample audio include the first labeled bottleneck features and the first labeled baseband features. During the training process, the fifth acoustic features corresponding to the first sample audio output by the first sub-model for feature extraction 101 also include: predicted bottleneck features and predicted baseband features corresponding to the first sample audio.

After that, loss function information in this round of training is calculated based on the second acoustic features corresponding to the first sample audio, the fifth acoustic features corresponding to the first sample audio and a pre-established loss function. Coefficient values of the parameters included in the first sub-model for feature extraction 101 are adjusted in accordance with the loss function information in this round of training.

Through continuous iterative training of massive first sample audios, labeled texts corresponding to the first sample audios and the second acoustic features corresponding to the first sample audios (including first labeled bottleneck features and first labeled baseband features), the first sub-model for feature extraction 101 meeting the corresponding convergence conditions is finally obtained.

In the process of training, the second acoustic features corresponding to the first sample audio may be understood as the learning objective of the first sub-model for feature extraction 101.

In a possible implementation, the first labeled baseband features corresponding to the first sample audio may be obtained by analyzing the first sample audio through a Digital Signal Process (DSP) method. Schematically, as shown in FIG. 1*a*, the digital signal processing is performed on the first sample audio through the digital signal processor 105, to acquire the first labeled baseband features corresponding to the first sample audio. The specific implementations of the digital signal processor 105 are not restricted as long as the first labeled baseband features corresponding to the input first sample audio can be extracted.

In addition, the first labeled baseband features corresponding to the first sample audio may be obtained through other methods in addition to the digital signal processing. The implementations for obtained the first labeled baseband features are not restricted in the present disclosure. For example, sample audios and the labeled baseband features corresponding to the sample audios may be stored in the database, or obtained from the database.

It is to be explained that the convergence conditions corresponding to the first sub-model for feature extraction may include, but not limited to, iteration number and loss threshold among other evaluation indicators. The convergence conditions corresponding to the training of the first sub-model for feature extraction are not restricted in the present disclosure. Besides, when the training is performed based on the labeled bottleneck features corresponding to the first sample audio or the first labeled bottleneck features and the first labeled baseband features corresponding to the first sample audio, the convergence conditions may vary.

Furthermore, when training is performed based on the first labeled bottleneck features corresponding to the first sample audio or the first labeled bottleneck features and the first labeled baseband features corresponding to the first sample audio, the loss function of the pre-established first sub-model for feature extraction may be the same or different. The implementations for the loss function of the pre-established first sub-model for feature extraction are not restricted in the present disclosure.

The network structure of the first sub-model for feature extraction is schematically illustrated below.

FIG. 1*b* schematically illustrates an implementation of the first sub-model for feature extraction 101. With reference to FIG. 1*b*, the first sub-model for feature extraction 101 may include: a text encoding network 1011, an attention network 1012 and a decoding network 1013.

Wherein the text encoding network 1011 is used for receiving the text as input, analyzing context and temporal relation of the input text and modeling an intermediate feature sequence, wherein the intermediate feature sequence contains context information and temporal relation.

The decoding network 1013 may adopt an auto-regressive network structure to take an output of a previous time step as an input for the next time step.

The attention network 1012 is mainly provided for outputting attention coefficients. A weighted average operation is performed on the attention coefficients and the intermediate feature sequence output by the text encoding network 1101 to obtain a weighted average result, which weighted average result serves as a further condition input of each time step of the decoding network 1013. The decoding network 1013 outputs the predicted acoustic features corresponding to the text by performing feature conversion on the inputs (i.e., the weighted average result and the output of the previous time step).

With reference to the above two implementations, the predicted acoustic features corresponding to the text may include: predicted bottleneck features corresponding to the text; or the predicted acoustic features corresponding to the text may include: bottleneck features corresponding to the text and baseband features corresponding to the text.

Besides, the initial values of the coefficients of the parameters included in the first sub-model for feature extraction 101 may be randomly generated, or preset. Alternatively, the initial values may be determined through other ways and the present disclosure is not restricted in this regard.

The first sub-model for feature extraction 101 is iteratively trained based on the labeled texts respectively corresponding to a plurality of sample audios and the first labeled acoustic features respectively corresponding to the first sample audio, to constantly optimize the coefficient values of the parameters included in the first sub-model for feature extraction 101. The training of the first sub-model for feature extraction 101 is stopped until the convergence conditions of the first sub-model for feature extraction 101 are met.

It should be understood that the above described first sample audio is in one-to-one correspondence with the corresponding labeled texts, i.e., they are sample data in pairs.

II. Training the Second Sub-Model for Feature Extraction 102

The training for the second sub-model for feature extraction 102 includes two phases, wherein the first phase refers to training the second sub-model for feature extraction based on the second sample audio to obtain an intermediate model; and the second phase refers to tuning the intermediate model based on the third sample audio to obtain the final second sub-model for feature extraction.

The timbre of the second sample audio is not restricted in the present disclosure; besides, the third sample audio is a sample audio with the target timbre.

The training process for the second sub-model for feature extraction 102 is to be introduced in details below:

First Phase:

In the first-phase training, the second sub-model for feature extraction 102 is provided for obtaining an intermediate model through iterative training of the second sample audio.

The second sub-model for feature extraction 102 obtains the intermediate model having a given speech synthesis control power over the timbre by learning the mapping relation between the third acoustic features corresponding to the second sample audio and the first labeled Mel spectrum features of the second sample audio, wherein the Mel spectrum features include: timbre information.

Parameters of the first sample audio, like timbre, duration, storage format and quantity, are not restricted in the present disclosure. The second sample audio may include the audio with the target timbre and also may include audio in non-target timbre.

During the first-phase training, the second sub-model for feature extraction 102 analyzes the second acoustic features corresponding to the input second sample audio and outputs the predicted Mel spectrum features corresponding to the second sample audio; the coefficient values of the parameters included in the second sub-model for feature extraction 102 are then adjusted based on the first labeled Mel spectrum features corresponding to the second sample audio and the predicted Mel spectrum features corresponding to the second sample audio; the intermediate model is obtained by continuous iterative training of the second sub-model for feature extraction 102 through a vast amount of the second sample audios.

In the first-phase training, the first labeled Mel spectrum features may be appreciated as the learning objective of the second sub-model for feature extraction 102 in the first phase.

Since the input of the second sub-model for feature extraction 102 is the third acoustic features corresponding to the second sample audio, it is not required to label corresponding texts of the second sample audio. This may greatly reduce the time and manual costs for acquiring the second sample audio. Besides, a large amount of audios may be obtained at relatively low costs as the second sample audio for iterative training of the second sub-model for feature extraction 102. Furthermore, the second sub-model for feature extraction 102 is trained based on a vast amount of second sample audios, such that the intermediate model has a relatively great speech synthesis control power over the timbre.

Second Phase:

In the second phase, the intermediate model is trained based on the third sample to learn the target timbre, thereby gaining a speech synthesis control power over the timbre.

It is to be explained that because the intermediate power has already gained a great speech synthesis control power over the timbre, the requirements for the third sample audio may be lowered. For example, the requirements for the duration and the quality of the third sample audio are reduced. Even if the third sample audio is short in duration and poor in pronunciation etc., the final second sub-model for feature extraction 102 obtained from training still can gain a relatively great speech synthesis control power over the timbre.

Besides, the third sample audio has the target timbre, and may be a user recorded audio or an audio with the desired timbre uploaded by the user. The present disclosure is not restricted in this regard.

Specifically, the fourth acoustic features corresponding to the third sample audio may be input to the intermediate model, to obtain the predicted Mel spectrum features corresponding to the third sample audio output by the intermediate model; the loss function information in this round of training is calculated based on the second labeled Mel spectrum features corresponding to the third sample audio and the predicted Mel spectrum features corresponding to the third sample audio; the coefficient values of the parameters included in the intermediate model are adjusted in accordance with the loss function information to obtain the final second sub-model for feature extraction 102.

In the second-phase training, the second labeled Mel spectrum features corresponding to the third sample audio may be appreciated as the learning objective of the intermediate model.

With reference to the previous introduction of the first sub-model for feature extraction 101, during training, if the fifth acoustic features output by the first sub-model for feature extraction 101 in accordance with the input labeled texts of the first sample audio include the predicted bottleneck features, i.e., the first sub-model for feature extraction 101 can implement the mapping from text to bottleneck feature, the third acoustic features corresponding to the second sample audio input to the second sub-model for feature extraction 102 include the second labeled bottleneck features corresponding to the second sample audio, and the fourth acoustic features corresponding to the third sample audio input to the intermediate model include the third labeled bottleneck features corresponding to the third sample audio.

The second labeled bottleneck features and the third labeled bottleneck features may be obtained by respectively performing the bottleneck feature extraction on the second sample audio and the third sample audio via the encoder of the ASR model. This is similar to the implementation for obtaining the first labeled bottleneck features and will not be repeated here for conciseness.

During training, if the fifth acoustic features output by the first sub-model for feature extraction 101 in accordance with the input labeled texts of the first sample audio include the predicted bottleneck features and predicted baseband features, i.e., the first sub-model for feature extraction 101 can implement the mapping from text to bottleneck feature and baseband feature, the third acoustic features corresponding to the second sample audio input to the second sub-model for feature extraction 102 include the second labeled bottleneck features and the second labeled baseband features corresponding to the second sample audio, and the fourth acoustic features corresponding to the third sample audio input to the intermediate model include the third labeled bottleneck features and the third labeled baseband features corresponding to the third sample audio.

The second labeled bottleneck features and the third labeled bottleneck features may be obtained by respectively performing the bottleneck feature extraction on the second sample audio and the third sample audio via the encoder of the ASR model. This is similar to the implementation for acquiring the first labeled bottleneck features. The second labeled baseband features and the third labeled baseband features may be obtained by analyzing the second sample audio and the third sample audio respectively with the digital signal processing technology. This is similar to the implementation for obtaining the first labeled baseband features and will not be repeated here for conciseness.

To sum up, during the training, the input of the second sub-model for feature extraction 102 remains consistent with the output of the first sub-model for feature extraction 101.

In addition, during the training of the second sub-model for feature extraction 102, the initial values of the corresponding coefficients of the respective parameters included in the second feature extractions sub-model 102 may be preset or randomly initialized. The present disclosure is not restricted in this regard.

Moreover, the pre-established loss function respectively used in the first-phase training and the second-phase training may be the same or different. The present disclosure is not restricted in this regard.

FIG. 1*c* schematically illustrates an implementation of the second sub-model for feature extraction 102. With reference to FIG. 1*c*, the second sub-model for feature extraction 102 may be implemented by a self-attention network structure.

In FIG. 1*c*, the second sub-model for feature extraction 102 includes: a convolutional network 1021 and one or more residual networks 1022, wherein each residual network 1022 consists of a self-attention network 1022*a* and a linear network 1022*b*.

The convolutional network 1021 is mainly used for performing a convolution processing on the input acoustic features corresponding to the sample audio and modelling the local feature information, wherein the convolutional network 1021 may include one or more convolutional layers. The quantity of the convolutional layers included in the convolutional network 1021 is not restricted in the present disclosure. In addition, the convolutional network 1021 inputs the local feature information to the connected residual network 1022.

The above one or more residual networks 1022 are converted into Mel spectrum features after passing through the above one or more residual networks 1022.

It should be understood that the intermediate model has the same structure as the second sub-model for feature extraction 102 shown in FIG. 1*c*. The difference here is that the included parameters have completely different weighted coefficients.

Through the above training for the first sub-model for feature extraction 101 and the second sub-model for feature extraction 102, the first feature extraction model and the second feature extraction model meeting the speech synthesis requirements are finally obtained. The finally obtained first feature extraction model and second feature extraction model are then combined to obtain the speech synthesis model that can synthesize the target timbre.

In some cases, the speech synthesis model 100 also may include: a vocoder 103, which is used for converting the Mel spectrum feature output by the second sub-model for feature extraction 102 into audio. Of course, the vocoder also may serve as an independent module without binding with the speech synthesis model. The specific types of the vocoder is not restricted in this solution.

On the basis of the embodiments shown by FIGS. 1*a* to 1*c*, the sample audio in different languages may be used for training in the present solution, such that the finally obtained speech synthesis model has a cross-style speech synthesis control capability.

Optionally, the first sample audio and the second sample audio may have the same language; the first sample audio and the third sample audio may be in different languages; and the second sample audio and the third sample audio may have different languages.

Assuming that both the first sample audio and the second sample audio are audio data in Chinese and the third sample audio with the target timbre is audio data in English, the finally obtained speech synthesis model can synthesize a Chinese audio having English speaking style, where the Chinese audio has the target timbre.

Assuming that both the first sample audio and the second sample audio are audio data in English and the third sample audio with the target timbre is audio data in Chinese, the finally obtained speech synthesis model can synthesize a Chinese audio having Chinese speaking style, where the Chinese audio has the target timbre.

In practical use, the first sample audio and the second sample audio may be in any random languages; the third sample audio has a language different from the first sample audio and the second sample audio. In such case, the cross-style speech synthesis is implemented. Besides, a small amount of third sample audio also can realize a stable cross-style speech synthesis.

On the basis of the embodiments shown by FIGS. 1*a* to 1*c*, the final target speech synthesis model obtained from training has a stable capability for synthesizing an audio having the target timbre. Accordingly, the target speech synthesis model may process corresponding speech synthesis services.

Figure 2:
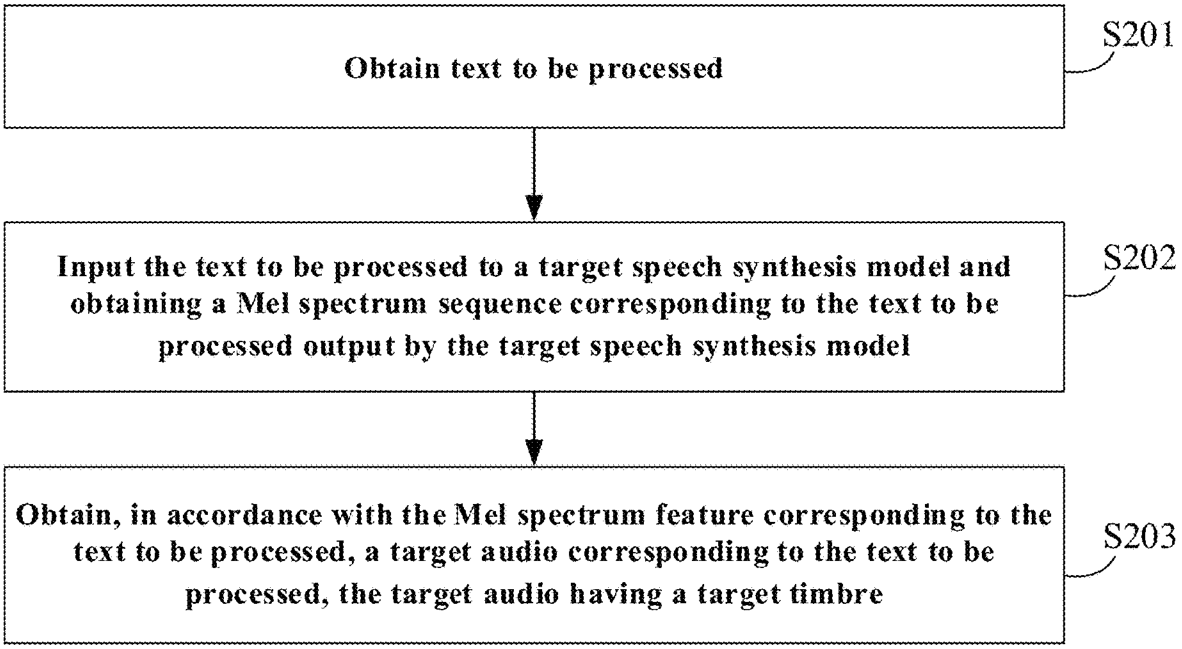
FIG. 2 is a flow chart of a method for speech synthesis provided by some embodiments of the present disclosure.

FIG. 2 is a flowchart of a method for speech synthesis provided by one embodiment of the present disclosure. With reference to FIG. 2, the method for speech synthesis provided the embodiments includes:

S201: obtain text to be processed.

The text to be processed may include a character sequence and also may consist of a phoneme sequence. The text to be processed includes a character sequence or a phoneme sequence for synthesizing an audio with the target timbre (hereinafter referred to as target audio).

Parameters of the text to be processed, including length, language and storage formats etc., are not restricted in this embodiment, wherein the language corresponding to the text to be processed remains consistent with the language of the first sample audio and the second sample audio in the training phase; for example, in case that the language corresponding to the first sample audio and the second sample audio is Chinese, the corresponding language of the text to be processed is Chinese.

S202: input the text to be processed to a target speech synthesis model and obtaining a Mel spectrum sequence corresponding to the text to be processed output by the target speech synthesis model.

With reference to the embodiments shown by FIGS. 1*a* to 1*c*, the target speech synthesis model includes trained first sub-model for feature extraction and trained second sub-model for feature extraction. The first sub-model for feature extraction and the second sub-model for feature extraction may refer to the above detailed description of the embodiments and will not be repeated here.

In some embodiments, the text to be processed is input into the target speech synthesis model. The first feature extraction model outputs the bottleneck features corresponding to the text to be processed by performing the feature extraction on the text to be processed. The second feature extraction model receives the bottleneck features corresponding to the text to be processed as input and outputs the Mel spectrum features corresponding to the text to be processed.

In some further embodiments, the text to be processed is input into the target speech synthesis model. The first feature extraction model outputs the bottleneck features and baseband features corresponding to the text to be processed by performing feature extraction on the text to be processed. The second feature extraction model receives the bottleneck features and the baseband features corresponding to the text to be processed as input and outputs the Mel spectrum features corresponding to the text to be processed.

S203: obtain, in accordance with the Mel spectrum feature corresponding to the text to be processed, a target audio corresponding to the text to be processed, the target audio having a target timbre.

In view of any of the above methods, the Mel spectrum features may be converted into audios with target timbre based on the vocoder.

In some embodiments, the vocoder may be part of the target speech synthesis model, such that the target speech synthesis model may output the audio with the target timbre. In some other cases, the vocoder may act as a module independent of the target speech synthesis model. The target speech synthesis model outputs the Mel spectrum features corresponding to the text to be processed and the vocoder receives the Mel spectrum features corresponding to the text to be processed as input and then converts them into the audio with the target timbre.

In the speech synthesis method provided by this embodiment, the text sequence to be processed is input to the pre-trained target speech synthesis model and the speech synthesis with the target timbre is performed based on the target speech synthesis model. In the speech synthesis scenarios, the user may specify the desired timbre of the audio to be synthesized through uploading the third sample audio. The user may even assign a desired speaking style by uploading the three sample audio in different languages, to satisfy the individualized needs of the users.

Figure 3:
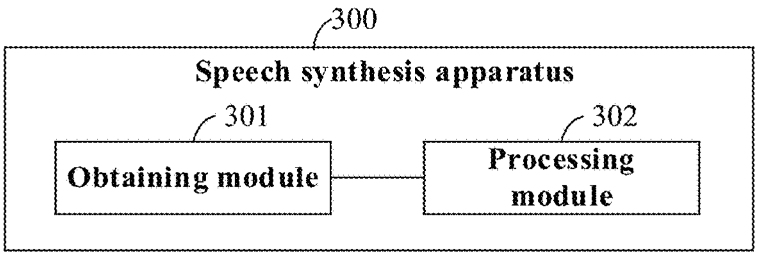
FIG. 3 is a structural diagram of an apparatus for speech synthesis provided by some embodiments of the present disclosure.

FIG. 3 is a structural diagram of an apparatus for speech synthesis provided by one embodiment of the present disclosure. With reference to FIG. 3, the apparatus 300 for speech synthesis provided by the embodiments comprises:

an obtaining module 301 for obtaining a text to be processed.

As stated above, the text to be processed may include a character sequence and also may consist of a phoneme sequence.

A processing module 302 is used for inputting the text to be processed to a target speech synthesis model and obtaining a Mel spectrum sequence corresponding to the text to be processed output by the target speech synthesis model; wherein the target speech synthesis model includes a first sub-model for feature extraction and a second sub-model for feature extraction, wherein the first sub-model for feature extraction is used for outputting a first acoustic feature according to the input text to be processed, the first acoustic feature including a bottleneck feature corresponding to the text to be processed; the second sub-model for feature extraction is used for outputting the Mel spectrum feature corresponding to the text to be processed according to the first acoustic feature as input.

The processing module 302 is further provided for obtaining, in accordance with the Mel spectrum feature corresponding to the text to be processed, a target audio corresponding to the text to be processed, the target audio having a target timbre.

In some possible implementations, the first sub-model for feature extraction is obtained by training based on labeled text corresponding to a first sample audio and a second acoustic feature corresponding to the first sample audio, the second acoustic feature including a first labeled bottleneck feature corresponding to the first sample audio.

In some possible implementations, the second feature extraction sub-model is obtained by training based on a third acoustic feature and a first labeled Mel spectrum feature corresponding to a second sample audio, and a fourth acoustic feature and a second labeled Mel spectrum feature corresponding to a third sample audio;

wherein the third acoustic feature includes a second labeled bottleneck feature corresponding to the second sample audio; the fourth acoustic feature includes a third labeled bottleneck feature corresponding to the third sample audio; and the third sample audio is a sample audio having the target timbre.

In some possible implementations, the first labeled bottleneck feature corresponding to the first sample audio, the second labeled bottleneck feature corresponding to the second sample audio and the third labeled bottleneck feature corresponding to the third sample audio are obtained by performing, using a an encoder of an end-to-end speech recognition model, bottleneck feature extraction on the first sample audio, the second sample audio and the third sample audio as input respectively.

In some possible implementations, the second acoustic feature further includes a first labeled baseband feature corresponding to the first sample audio; the third acoustic feature further includes a second labeled baseband feature corresponding to the second sample audio; and the fourth acoustic feature further includes a third labeled baseband feature corresponding to the third sample audio;

correspondingly, the first acoustic feature output by the first sub-model for feature extraction further includes a baseband feature corresponding to the text to be processed.

In some possible implementations, the first labeled baseband feature corresponding to the first sample audio, the second labeled baseband feature corresponding to the second sample audio and the third labeled baseband feature corresponding to the third sample audio are obtained by performing digital signal processing on the first sample audio, the second sample audio and the third audio respectively.

In some possible implementations, a language of the first sample audio is the same as that of the second sample audio; and the language of the first sample audio is different from that of the third sample audio.

The apparatus for speech synthesis provided by this embodiment may be used for executing the technical solution of any one of the above method embodiments. The implementation principle and the technical effect are similar to the method embodiments and may refer to the detailed description of the above method claims, and will not be repeated here for conciseness.

Figure 4:
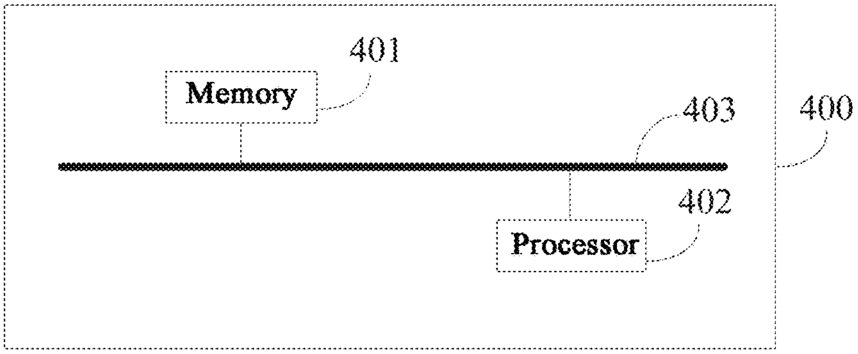
FIG. 4 is a structural diagram of the electronic device provided by one embodiment of the present disclosure.

FIG. 4 is a structural diagram of the electronic device provided by some embodiments of the present disclosure. With reference to FIG. 4, the electronic device 400 provided by the embodiments comprises: a memory 401 and a processor 402.

Wherein the memory 401 is an independent physical unit connected to the processor 402 via the bus 403. The memory 401 and the processor 402 may be integrated and implemented by hardware.

The memory 401 is used for storing program instructions while the processor 402 calls the program instructions to execute the operations of any of the above method embodiments.

Optionally, when the method of the above embodiment is partly or fully implemented by software, the above electronic device 400 may only include the processor 402. The memory 401 for storing the programs may be independent of the electronic device 400, and the processor 402 is connected to the memory via the circuit/wire for reading and executing programs stored in the memory.

The processor 402 may be a central processing unit (CPU), a network processor (NP) or a combination thereof.

The processor 402 also may further include a hardware chip. The above hardware chip may be Application-specific Integrated Circuit (ASIC), Programmable logic device (PLD) or a combination thereof. The above PLD may be Complex Programmable Logic Device (CPLD), Field-Programmable Gate Array (FPGA), Generic Array Logic (GAL) or any combinations thereof.

The memory 401 may include volatile memory, e.g., Random-Access Memory (RAM); the memory also may include non-volatile memory, such as flash memory, hard disk drive (HDD) or solid-state drive (SSD); the memory also may include a combination of the above types of memory.

The present disclosure provides a computer readable storage medium (also may referred to as readable storage medium) including computer program instructions, the computer program instructions, when executed by at least one processor of the electronic device, implementing the technical solution in any of the above method embodiments.

The present disclosure also provides a program product including computer program instructions, where in the computer program instructions are stored in the readable storage medium and may be read from the readable storage medium by at least one processor of the electronic device. The computer program instructions, when executed by the at least one processor, causing the electronic device to perform the technical solution according to any of the above method embodiments.

It is to be noted that relation terms such as "first" and "second" in the text are only used for distinguishing one entity or operation from a further entity or operation, without requiring or suggesting any actual relations or sequences between these entities or operations. Besides, the terms "comprising", "containing" or other variants indicate non-exclusive inclusion, such that the process, method, object or device including a series of elements also include other elements not listed in addition to those elements; alternatively, it also may include elements inherent in the process, method, object or device. Without more limitations, the process, method, object or device including the elements defined by the expression of "comprising/including one . . . " also may contain other same elements.

The above is just the specific implementations of the present disclosure, which are provided for those skilled in the art to understand or implement the present disclosure. Many modifications to the embodiments are obvious for those skilled in the art. General principles defined in the text may be implemented in other embodiments without deviating from the spirit or scope of the present disclosure. Therefore, the present disclosure will not be restricted to the embodiments disclosed herein and instead has a broadest scope consistent with the principles and novel features disclosed here.

We claim:

1. A method for speech synthesis, comprising:

obtaining text to be synthesized into target audio having a target timbre;

generating a first acoustic feature corresponding to the text based on inputting the text into a first sub-model of a target speech synthesis model, wherein the first acoustic feature comprises a bottleneck feature that does not include information related to the target timbre;

generating a Mel spectrum sequence corresponding to the text based on inputting the first acoustic feature into a second sub-model of the target speech synthesis model, wherein the Mel spectrum sequence includes information related to the target timbre; and synthesizing the target audio having the target timbre based on the Mel spectrum sequence.

2. The method of claim 1, wherein the first sub-model is obtained by training based on labeled text corresponding to a first sample audio and a second acoustic feature corresponding to the first sample audio, the second acoustic feature including a first labeled bottleneck feature corresponding to the first sample audio.

3. The method of claim 2, wherein the second sub-model is obtained by training based on a third acoustic feature and a first labeled Mel spectrum feature corresponding to a second sample audio, and a fourth acoustic feature and a second labeled Mel spectrum feature corresponding to a third sample audio;

wherein the third acoustic feature includes a second labeled bottleneck feature corresponding to the second sample audio; the fourth acoustic feature includes a third labeled bottleneck feature corresponding to the third sample audio; and the third sample audio is a sample audio having the target timbre.

4. The method of claim 3, wherein the first labeled bottleneck feature corresponding to the first sample audio, the second labeled bottleneck feature corresponding to the second sample audio and the third labeled bottleneck feature corresponding to the third sample audio are obtained by performing, using an encoder of an end-to-end speech recognition model, bottleneck feature extraction on the first sample audio, the second sample audio and the third sample audio as input respectively.

5. The method of claim 3, wherein the second acoustic feature further includes a first labeled baseband feature corresponding to the first sample audio; the third acoustic feature further includes a second labeled baseband feature corresponding to the second sample audio; and the fourth acoustic feature further includes a third labeled baseband feature corresponding to the third sample audio; and correspondingly, the first acoustic feature output by the first sub-model further includes a baseband feature corresponding to the text to be processed.

6. The method of claim 5, wherein the first labeled baseband feature corresponding to the first sample audio, the second labeled baseband feature corresponding to the second sample audio and the third labeled baseband feature corresponding to the third sample audio are obtained by performing digital signal processing on the first sample audio, the second sample audio and the third audio respectively.

7. The method of claim 3, wherein a language of the first sample audio is the same as that of the second sample audio; and the language of the first sample audio is different from that of the third sample audio.

8. An electronic device, comprising:

a memory having computer program instructions stored thereon, and a processor, wherein computer program instructions, when executed by the processor, cause the electronic device to perform operations comprising:

obtaining text to be synthesized into target audio having a target timbre;

generating a first acoustic feature corresponding to the text based on inputting the text into a first sub-model of a target speech synthesis model, wherein the first acoustic feature comprises a bottleneck feature that does not include information related to the target timbre;

generating a Mel spectrum sequence corresponding to the text based on inputting the first acoustic feature into a second sub-model of the target speech synthesis model, wherein the Mel spectrum sequence includes information related to the target timbre; and synthesizing the target audio having the target timbre based on the Mel spectrum sequence.

9. The electronic device of claim 8, wherein the first sub-model is obtained by training based on labeled text corresponding to a first sample audio and a second acoustic feature corresponding to the first sample audio, the second acoustic feature including a first labeled bottleneck feature corresponding to the first sample audio.

10. The electronic device of claim 9, wherein the second sub-model is obtained by training based on a third acoustic feature and a first labeled Mel spectrum feature corresponding to a second sample audio, and a fourth acoustic feature and a second labeled Mel spectrum feature corresponding to a third sample audio;

wherein the third acoustic feature includes a second labeled bottleneck feature corresponding to the second sample audio; the fourth acoustic feature includes a third labeled bottleneck feature corresponding to the third sample audio; and the third sample audio is a sample audio having the target timbre.

11. The electronic device of claim 10, wherein the first labeled bottleneck feature corresponding to the first sample audio, the second labeled bottleneck feature corresponding to the second sample audio and the third labeled bottleneck feature corresponding to the third sample audio are obtained by performing, using an encoder of an end-to-end speech recognition model, bottleneck feature extraction on the first sample audio, the second sample audio and the third sample audio as input respectively.

12. The electronic device of claim 10, wherein the second acoustic feature further includes a first labeled baseband feature corresponding to the first sample audio;

the third acoustic feature further includes a second labeled baseband feature corresponding to the second sample audio; and the fourth acoustic feature further includes a third labeled baseband feature corresponding to the third sample audio; and correspondingly, the first acoustic feature output by the first sub-model further includes a baseband feature corresponding to the text to be processed.

13. The electronic device of claim 12, wherein the first labeled baseband feature corresponding to the first sample audio, the second labeled baseband feature corresponding to the second sample audio and the third labeled baseband feature corresponding to the third sample audio are obtained by performing digital signal processing on the first sample audio, the second sample audio and the third audio respectively.

14. The electronic device of claim 10, wherein a language of the first sample audio is the same as that of the second sample audio; and the language of the first sample audio is different from that of the third sample audio.

15. A non-transitory readable storage medium, comprising computer program instructions which, when executed by at least one processor of an electronic device, cause the electronic device to perform operations comprising:

obtaining text to be synthesized into target audio having a target timbre;

generating a first acoustic feature corresponding to the text based on inputting the text into a first sub-model of a target speech synthesis model, wherein the first acoustic feature comprises a bottleneck feature that does not include information related to the target timbre;

generating a Mel spectrum sequence corresponding to the text based on inputting the first acoustic feature into a second sub-model of the target speech synthesis model, wherein the Mel spectrum sequence includes information related to the target timbre; and synthesizing the target audio having the target timbre based on the Mel spectrum sequence.

16. The non-transitory readable storage medium of claim 15, wherein the first sub-model is obtained by training based on labeled text corresponding to a first sample audio and a second acoustic feature corresponding to the first sample audio, the second acoustic feature including a first labeled bottleneck feature corresponding to the first sample audio.

17. The non-transitory readable storage medium of claim 16, wherein the second sub-model is obtained by training based on a third acoustic feature and a first labeled Mel spectrum feature corresponding to a second sample audio, and a fourth acoustic feature and a second labeled Mel spectrum feature corresponding to a third sample audio;

wherein the third acoustic feature includes a second labeled bottleneck feature corresponding to the second sample audio; the fourth acoustic feature includes a third labeled bottleneck feature corresponding to the third sample audio; and the third sample audio is a sample audio having the target timbre.

18. The non-transitory readable storage medium of claim 17, wherein the first labeled bottleneck feature corresponding to the first sample audio, the second labeled bottleneck feature corresponding to the second sample audio and the third labeled bottleneck feature corresponding to the third sample audio are obtained by performing, using an encoder of an end-to-end speech recognition model, bottleneck feature extraction on the first sample audio, the second sample audio and the third sample audio as input respectively.

19. The non-transitory readable storage medium of claim 17, wherein the second acoustic feature further includes a first labeled baseband feature corresponding to the first sample audio; the third acoustic feature further includes a second labeled baseband feature corresponding to the second sample audio; and the fourth acoustic feature further includes a third labeled baseband feature corresponding to the third sample audio; and correspondingly, the first acoustic feature output by the first sub-model includes a baseband feature corresponding to the text to be processed.

20. The non-transitory readable storage medium of claim 19, wherein the first labeled baseband feature corresponding to the first sample audio, the second labeled baseband feature corresponding to the second sample audio and the third labeled baseband feature corresponding to the third sample audio are obtained by performing digital signal processing on the first sample audio, the second sample audio and the third audio respectively.

* * * * *